United States Patent
Ishii

(10) Patent No.: US 9,609,220 B2
(45) Date of Patent: Mar. 28, 2017

(54) IMAGE PICKUP APPARATUS, IMAGE PICKUP METHOD, AND PROGRAM

(71) Applicant: CANON KABUSHIKI KAISHA, Tokyo (JP)

(72) Inventor: Takumi Ishii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/732,544

(22) Filed: Jun. 5, 2015

(65) Prior Publication Data
US 2015/0373282 A1 Dec. 24, 2015

(30) Foreign Application Priority Data

Jun. 24, 2014 (JP) ................. 2014-129455

(51) Int. Cl.
*H04N 5/232* (2006.01)
*H04N 5/235* (2006.01)
*H04N 5/14* (2006.01)

(52) U.S. Cl.
CPC ....... *H04N 5/23261* (2013.01); *H04N 5/2351* (2013.01); *H04N 5/2353* (2013.01); *H04N 5/2354* (2013.01); *H04N 5/145* (2013.01)

(58) Field of Classification Search
None
See application file for complete search history.

(56) References Cited

U.S. PATENT DOCUMENTS

| | | | | |
|---|---|---|---|---|
| 2002/0191099 A1* | 12/2002 | Okisu | ................ | H04N 5/23212 348/345 |
| 2003/0086005 A1* | 5/2003 | Nakamura | ........... | H04N 3/1562 348/223.1 |
| 2008/0186386 A1* | 8/2008 | Okada | ................ | H04N 5/23248 348/208.4 |
| 2010/0315521 A1* | 12/2010 | Kunishige | .............. | H04N 5/232 348/220.1 |

FOREIGN PATENT DOCUMENTS

| | | |
|---|---|---|
| JP | 2001-42379 A | 2/2001 |
| JP | 2010-250156 A | 11/2010 |

* cited by examiner

*Primary Examiner* — Mark T Monk
(74) *Attorney, Agent, or Firm* — Canon U.S.A., Inc. IP Division

(57) ABSTRACT

A photographing screen is divided into a plurality of blocks, for each of which a determination is made as to whether there is motion and then motion information is detected. At the same time, motion information of an image pickup apparatus is detected using an angular velocity sensor. From these motion information, the photographing screen is separated into a background region and a subject region, and contrast values in the background region are calculated. If the proportion of blocks determined to be high-contrast blocks in the background region is greater than a threshold, photographing conditions are set such that the exposure time increases as the amount of movement of the image pickup apparatus decreases. If the proportion described above is less than or equal to the threshold, photographing conditions are set such that a plurality of images are captured with different exposure times.

24 Claims, 6 Drawing Sheets

FIG. 3
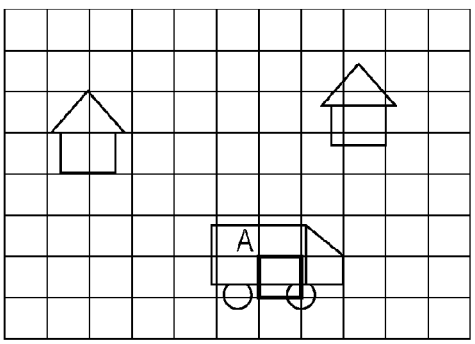
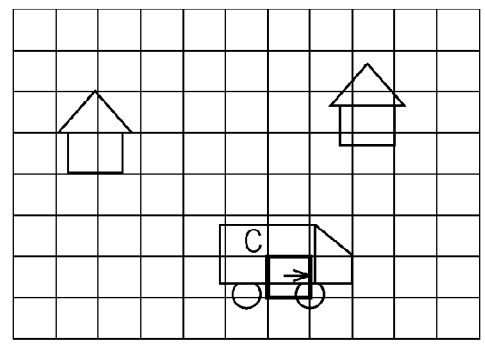
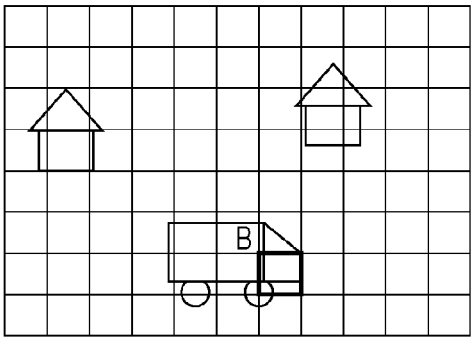
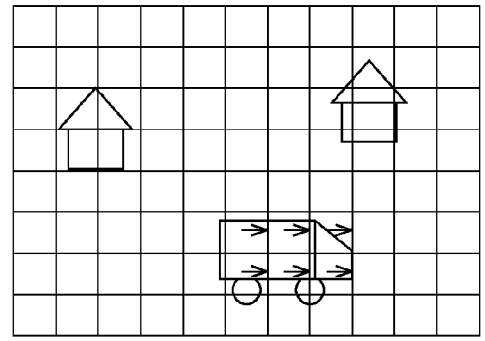

IMAGE PICKUP APPARATUS, IMAGE PICKUP METHOD, AND PROGRAM

BACKGROUND OF THE INVENTION

Field of the Invention

The present invention relates to an image pickup apparatus, an image pickup method, and a program that are particularly suitable for use in photographing under photographing conditions for panning.

Description of the Related Art

Panning involves keeping a moving subject in focus while allowing its background to blur. This enables photographers to capture images that can show the fast movement of the subject. An image pickup apparatus is known, which determines whether the image pickup apparatus is following a subject on the basis of image information within an optical system and a photographing screen, and changes the exposure time in accordance with the determination (see, e.g., Japanese Patent Laid-Open No. 2010-250156). Another image pickup apparatus is also known, which detects not only the amount of shake of the image pickup apparatus but also detects the focus state of a photographing lens, makes a panning determination in accordance with whether the output of the focus state has changed within a predetermined period of time, and changes the exposure time in accordance with the determination (see, e.g., Japanese Patent Laid-Open No. 2001-42379).

In the related techniques disclosed in the two documents, even if the exposure time suitable for panning is set when the motion of the image pickup apparatus is in a panning state, the degree of background blur may not be high enough to fully achieve a panning effect. Also, if the exposure time is suitable for panning, the subject may be more likely to blur.

SUMMARY OF THE INVENTION

In view of the situation described above, the present invention provides a technique by which photographing conditions can be changed in accordance with a panning effect.

An image pickup apparatus according to an aspect of the present invention includes an image pickup unit configured to pick up an image of a subject to generate image data, a separating unit configured to separate the image data into a subject region and a background region, a calculating unit configured to calculate contrast values of the background region, and a control unit configured to perform control such that photographing conditions for panning are changed in accordance with the calculated contrast values of the background region.

Further features of the present invention will become apparent from the following description of exemplary embodiments with reference to the attached drawings.

BRIEF DESCRIPTION OF THE DRAWINGS

FIG. 3 is a diagram for explaining a motion vector in each block.

DESCRIPTION OF THE EMBODIMENTS

Embodiments of the present invention will now be described in detail with reference to the drawings. The embodiments described below are merely examples for implementing the present invention, and are to be appropriately modified or changed in accordance with the configuration or various conditions of an apparatus to which the present invention is applied. It is to be noted that the present invention is not limited to the embodiments described below. In the present embodiment, a digital camera is used as an image pickup apparatus.

Figure 1:
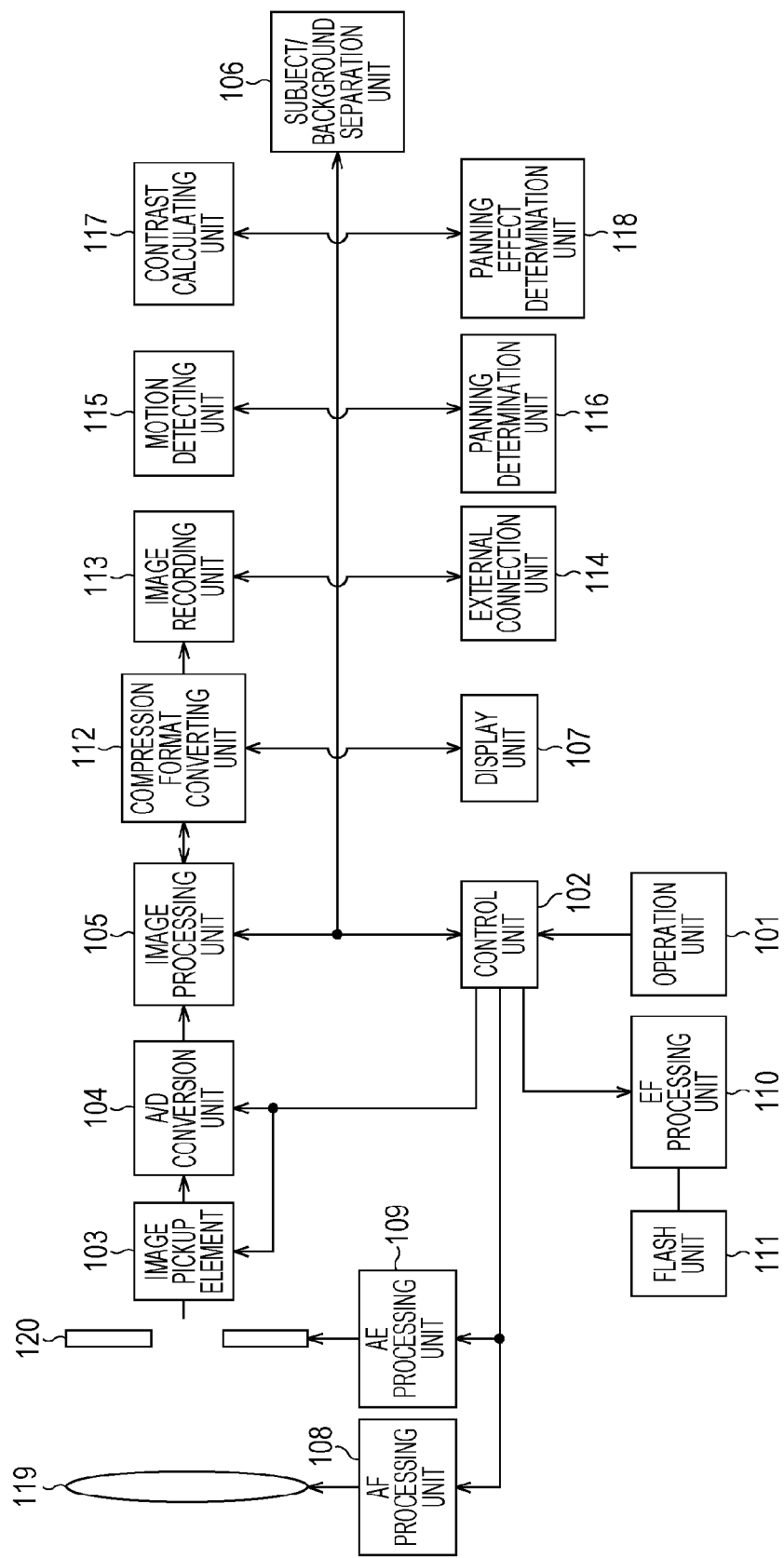
FIG. 1 is a block diagram illustrating an internal configuration of an image pickup apparatus according to an embodiment.

FIG. 1 is a block diagram illustrating an internal configuration of an image pickup apparatus 100 according to the present embodiment. In FIG. 1, an operation unit 101 includes switches and buttons for the operator of the image pickup apparatus 100 to input various instructions into the image pickup apparatus 100. A control unit 102 controls the operation of each of the units illustrated in FIG. 1. The control unit 102 controls each unit in accordance with an instruction from the operation unit 101. The operation unit 101 includes a shutter button. If the shutter button is pressed halfway down, signal SW1 is sent as a notification from the operation unit 101 to the control unit 102. If the shutter button is pressed all the way down, signal SW2 is sent as a notification from the operation unit 101 to the control unit 102.

The image pickup element 103 is a charge-coupled device (CCD) sensor or complementary metal oxide semiconductor (CMOS) sensor having a photoelectric conversion function. The image pickup element 103 receives light incident through a lens 119 and an exposure mechanism 120, and outputs charges in accordance with the amount of the received light. An autofocus (AF) processing unit 108 operates the lens 119 to bring a subject into focus. An automatic exposure (AE) processing unit 109 controls the exposure mechanism 120 such that the screen is at an optimum level of exposure.

An analog-to-digital (A/D) conversion unit 104 performs sampling, gain adjustment, A/D conversion, and the like on an analog image signal output from the image pickup element 103, and outputs the resulting signal as a digital image signal (hereinafter referred to as image data). An image processing unit 105 performs various types of image processing on the image data output from the A/D conversion unit 104, and outputs the processed image data. For example, the image processing unit 105 converts the image data received from the A/D conversion unit 104 into a YUV image signal and outputs it.

A motion detecting unit 115 divides a photographing screen (including a background and a subject) into a plurality of blocks (small regions), and determines whether there is motion in each block. Also, for each block, the motion detecting unit 115 calculates motion information, such as the direction of motion and the amount of motion, as a motion vector. The motion detecting unit 115 also calculates such motion information as the amount of motion of the image pickup apparatus 100 by using an angular velocity sensor (not shown). On the basis of the output from a subject/background separation unit 106 (described below), the motion detecting unit 115 calculates motion information of the background and motion information of the subject (which is a portion other than the background) in the photographing screen.

A contrast calculating unit 117 extracts edge components in the photographing screen, and calculates a contrast value on the basis of the extracted edge components. Under the same conditions as in the case of the motion detecting unit 115, the contrast calculating unit 117 divides the photographing screen into a plurality of blocks (small regions) within a predetermined size range, and determines for each block whether the contrast is high.

The subject/background separation unit 106 compares motion information calculated as a motion vector by the motion detecting unit 115 with motion information of the image pickup apparatus 100 calculated using the angular velocity sensor. For each motion vector, the subject/background separation unit 106 determines whether the motion vector corresponds to the motion of the image pickup apparatus 100. If the motion vector corresponds to the motion of the image pickup apparatus 100, the subject/background separation unit 106 determines that the block belongs to the background and if not, the subject/background separation unit 106 determines that the block belongs to the subject. Thus, the blocks determined to belong to the background form a background region and the blocks determined to belong to the subject form a subject region, so that the photographing screen is separated into the subject and the background.

A panning determination unit 116 determines whether a panning operation is in progress by using the motion information of the background, the motion information of the subject, and the motion information of the image pickup apparatus 100. A panning effect determination unit 118 determines, by using contrast information, whether a panning effect can be achieved.

If the control unit 102 determines that a flash is necessary and sends an instruction to a pre-flash (EF) processing unit 110 to turn on the flash, the EF processing unit 110 controls a flash unit 111 to fire the flash. A display unit 107 includes, for example, a liquid crystal screen, and displays an image based on image data processed by the image processing unit 105.

A compression format converting unit 112 converts a compression format of image data output from the image processing unit 105 into a different compression format, such as joint picture expert group (JPEG), and outputs the resulting image data to an image recording unit 113. The image recording unit 113 records the image data output from the compression format converting unit 112 in an internal memory (not shown) of the image pickup apparatus 100 or an external memory inserted in the image pickup apparatus 100. An external connection unit 114 serves as an interface that allows the image pickup apparatus 100 to connect to an external device, such as a personal computer (PC) or a printer.

A photographing operation of the image pickup apparatus 100 will now be described. First, when the operator of the image pickup apparatus 100 turns on a power switch included in the operation unit 101, the control unit 102 detects that the power switch has been turned on and supplies power to each of the units included in the image pickup apparatus 100. In response to the supply of power, a shutter (not shown) opens to allow light to pass through the lens 119 and the exposure mechanism 120 and reach the image pickup element 103. The image pickup element 103 reads out charges stored therein and outputs them as an analog image signal to the A/D conversion unit 104. The same process is performed when the image pickup apparatus 100 switches from reproducing mode to photographing mode.

The A/D conversion unit 104 performs sampling, gain adjustment, A/D conversion, and the like on the analog image signal output from the image pickup element 103, and outputs the resulting signal as image data. Next, the image processing unit 105 performs various types of image processing on the image data output from the A/D conversion unit 104, and outputs the processed image data.

In the present embodiment, two images obtained in a time sequence (i.e., a currently captured image and an image photographed before that) are each divided into a plurality of blocks (small regions), and the corresponding blocks are compared to each other. From the resulting differential information, motion information (including the position, the range of motion, and the amount of motion) of the subject and the background is detected. For separation into the subject and the background, the subject/background separation unit 106 separates the photographing screen into a subject region and a background region on the basis of the motion information obtained by the motion detecting unit 115 and the motion information obtained using the angular velocity sensor.

Next, on the basis of the motion information described above, the panning determination unit 116 determines whether the photographing operation currently in progress is a panning operation. If the panning determination unit 116 determines that the photographing operation currently in progress is not a panning operation, the control unit 102 changes an exposure control value to be suitable for non-panning scenes. On the other hand, if the panning determination unit 116 determines that the photographing operation currently in progress is a panning operation, the control unit 102 sets the image pickup apparatus 100 to panning mode and controls the photographing conditions for main exposure in accordance with the determination made by the panning effect determination unit 118 (the details of this operation will be described later on).

Next, on the basis of the level of contrast determined for each block by the contrast calculating unit 117, the panning effect determination unit 118 determines whether the proportion of high-contrast blocks in the background region is greater than a predetermined value. If the proportion of high-contrast blocks in the background region is greater than the predetermined value, the panning effect determination unit 118 determines that a panning effect can be achieved. On the other hand, if the proportion of high-contrast blocks in the background region is less than or equal to the predetermined value, the panning effect determination unit 118 determines that no panning effect can be achieved.

Next, the image processing unit 105 performs various types of image processing on the image data output from the A/D conversion unit 104 to obtain processed image data. The image processing unit 105 outputs the processed image data to the display unit 107 to display, in real time, an image based on the processed image data in the display unit 107. The process described above is repeated until signal SW1 indicating that the shutter button has been pressed halfway down is sent as a notification from the operation unit 101 to the control unit 102.

When signal SW1 is sent from the operation unit 101 to the control unit 102, the control unit 102 performs AF and AE processing using the image at this point to acquire an optimal in-focus state and exposure setting conditions for photographing. Then, the process performed before reception of signal SW1 is repeated until signal SW2 indicating that the shutter button has been pressed all the way down is sent from the operation unit 101 to the control unit 102.

When signal SW2 is sent from the operation unit 101 to the control unit 102, the control unit 102 determines whether to fire the flash. The determination as to whether to fire the flash may be made by reading data set in advance by the operator's operation of the operation unit 101. Alternatively, the determination may be made on the basis of detected brightness of the captured image.

If the control unit 102 determines that the flash is to be fired, the control unit 102 controls the EF processing unit 110 to cause the flash unit 111 to fire a pre-flash. At the same time, the control unit 102 instructs the EF processing unit 110 to calculate the amount of flash and perform weighting of flash in the captured image. Then, the EF processing unit 110 causes the flash unit 111 to fire a flash by an amount of main flash calculated by firing a pre-flash, and performs photographing with the flash on.

If the control unit 102 determines that the flash is not to be fired, the control unit 102 proceeds to perform the following operation without computing the amount of flash described above. First, light incident from the field of view passes through the lens 119 and the exposure mechanism 120 and is incident on the image pickup element 103. Charges corresponding to the amount of incident light are thus stored in photoelectric conversion elements (not shown) forming the image pickup element 103. Then, the image pickup element 103 reads out the charges stored therein and outputs them as an analog image signal to the A/D conversion unit 104.

The A/D conversion unit 104 performs sampling, gain adjustment, A/D conversion, and the like on the analog image signal output from the image pickup element 103, and outputs the resulting signal as image data. Next, the image processing unit 105 performs various types of image processing on the image data output from the A/D conversion unit 104, and outputs the processed image data. The compression format converting unit 112 converts the compression format of the image data output from the image processing unit 105 into a different compression format, such as JPEG, and outputs the resulting image data to the image recording unit 113. The image recording unit 113 records the image data output from the compression format converting unit 112 in a predetermined memory.

The process described above makes it possible not only to determine whether the image pickup apparatus 100 is in a panning state, but also to determine whether the image pickup apparatus 100 is in a state where a panning effect can be achieved, and thus to change the photographing conditions in accordance with the determination.

A description will now be given of control of a panning determination and a panning effect determination that are made using motion detection.

Figure 2:
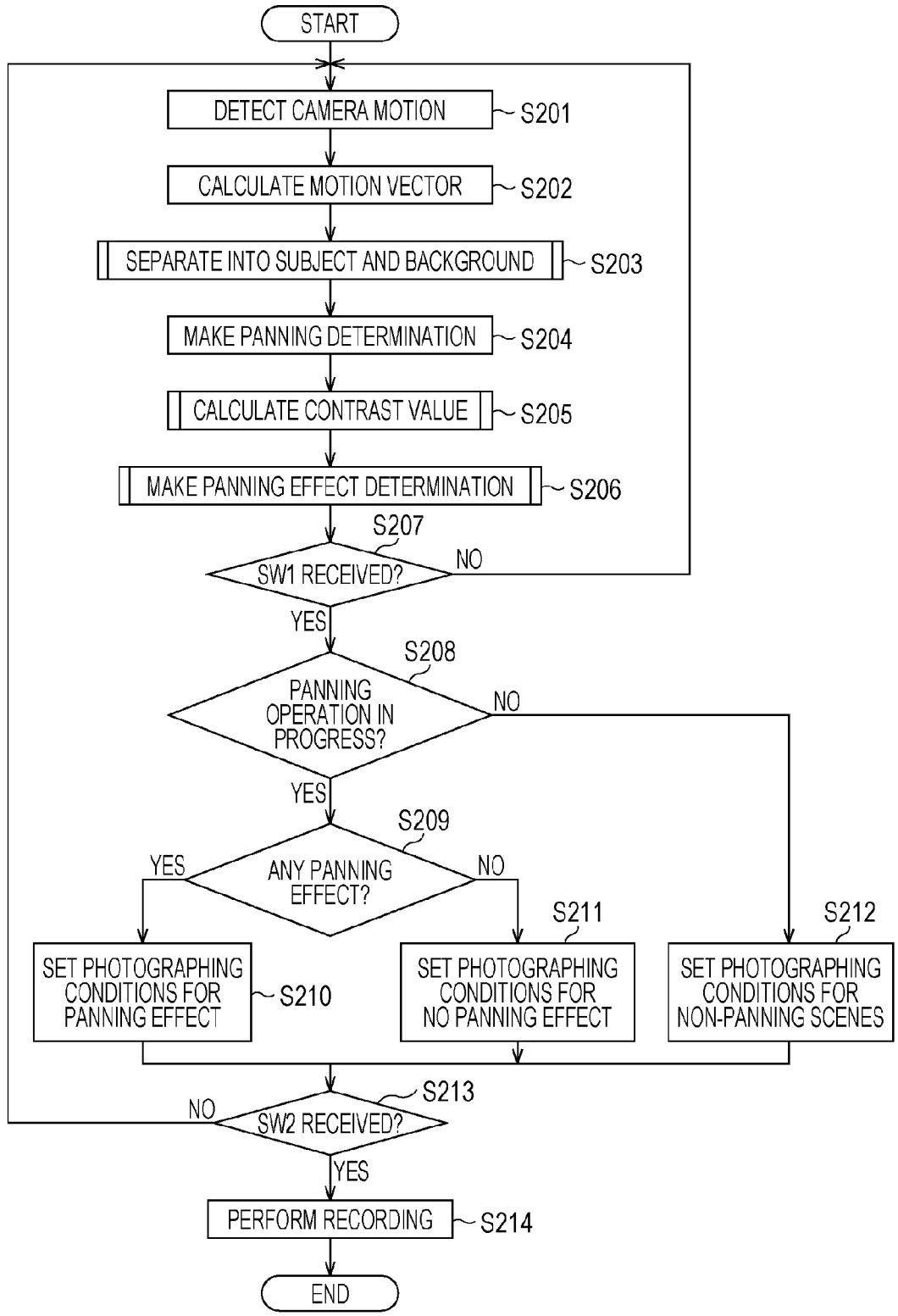
FIG. 2 is a flowchart illustrating a procedure of a photographing operation performed by the image pickup apparatus according to the embodiment.

FIG. 2 is a flowchart illustrating a procedure of a photographing operation performed by the image pickup apparatus 100 according to the present embodiment.

The process starts when the power is turned on or the image pickup apparatus 100 is switched to photographing mode. In step S201, the motion detecting unit 115 acquires motion information of the image pickup apparatus 100 from the angular velocity sensor. In the present embodiment, the angular velocity sensor outputs an angular velocity in at least one of the pitch and yaw directions, and the motion information is the output of this angular velocity sensor.

In step S202, the motion detecting unit 115 divides each of two images P1 and P2 (see FIG. 3) obtained in a time sequence into a plurality of blocks. Here, the image P1 represents a currently captured image, and the image P2 represents an image photographed before the image P1. The motion detecting unit 115 divides each of the images P1 and P2 into a plurality of blocks such that the number of blocks and their positions are the same in both the images P1 and P2. In the example of FIG. 3, all the blocks are arranged without any gaps therebetween over the entire screen. However, blocks in only part of the screen may be arranged without any gaps therebetween, or all the blocks may be spaced apart from each other over the entire screen.

Then, between the corresponding blocks located at the same positions in the two images, template matching based on brightness is performed to calculate a motion vector. For example, from template matching between block A in image P1 and block B in image P2, a motion vector shown in image P3 is obtained. The calculation of a motion vector for every block in the screen can produce image P4.

For example, brightness information of each block is used for template matching in the present embodiment. Specifically, the absolute value of a difference between a brightness value of each pixel in block A of image P1 and a brightness value of the corresponding pixel in block B of image P2 is taken, and the resulting absolute values are summed (i.e., the sum of absolute differences or SAD is calculated). The SAD is further calculated at each of different positions reached by shifting the position of block B little by little. Then, a region with the smallest SAD is regarded as a region similar to block A, and a difference between the position of this region and that of block A is determined to be a motion vector.

In step S203, the photographing screen is separated into a subject region and a background region. The details of this operation will be described later on with reference to FIG. 4.

In step S204, the panning determination unit 116 determines whether the image pickup apparatus 100 is performing a panning operation, on the basis of the subject region and the background region obtained in step S203 and their motion information.

For example, the determination of whether a panning operation is being performed is made on the basis of motion vectors in the subject region and the background region obtained in step S203. For example, if a state where motion vectors in the subject region are small and motion vectors in the background region are large (i.e., a state where a difference in motion vector between the background region and the subject region exceeds a predetermined value) has continued for a predetermined period of time, the panning determination unit 116 determines that the image pickup apparatus 100 is performing a panning operation. An angular velocity in the pitch or yaw direction output from the angular velocity sensor may be used to make the determination. For example, if the output angular velocity in the pitch or yaw direction is nearly constant and greater than a predetermined value, the image pickup apparatus 100 is not regarded as being at rest, and is regarded as moving at an equiangular velocity. In this case, the panning determination unit 116 determines that the image pickup apparatus 100 is performing a panning operation.

In step S205, the contrast calculating unit 117 calculates a contrast value for each of the plurality of regions (blocks) obtained by dividing the photographing screen. The details of this operation will be described later on with reference to FIG. 5.

In step S206, the panning effect determination unit 118 determines whether the captured image can achieve a panning effect. The details of this operation will be described later on with reference to FIG. 6. After the determination is made in step S206 as to whether the captured image can achieve a panning effect, the result of the determination may be presented to the user as an icon in the display unit 107. Alternatively, predetermined sound or light may be used to notify the user of the result of the determination. This allows the user to know in advance whether the background has a panning effect, and also to operate the shutter button in accordance with a location in the background which is known beforehand to have a panning effect. The user may be notified of only one of the results of the determination.

In step S207, the control unit 102 determines whether signal SW1 has been received from the operation unit 101. If signal SW1 is determined to have been received, the process proceeds to step S209. If signal SW1 has not been received, the process returns to step S201 and is repeated.

In step S208, the control unit 102 determines whether the most recent result of the determination made in step S204 is that a panning operation is in progress. If the result of the determination is that a panning operation is in progress, the process proceeds to step S209. If the result of the determination is that a panning operation is not in progress, the process proceeds to step S212.

In step S209, the control unit 102 determines whether the most recent result of the determination made in step S206 is that a panning effect can be achieved. If the result of the determination is that a panning effect can be achieved, the process proceeds to step S210. If the result of the determination is that no panning effect can be achieved, the process proceeds to step S211.

In step S210, the control unit 102 sets photographing conditions suitable for scenes with a panning effect. In the present embodiment, for example, the control unit 102 sets photographing conditions such that the smaller the calculated amount of movement of the image pickup apparatus 100, the longer the exposure time. If a proper level of exposure is exceeded in the set exposure time, the set exposure time is corrected to the longest exposure time after the proper level of exposure is satisfied.

As a photographing condition suitable for scenes with a panning effect, the intensity of noise reduction may be set higher than that in photographing conditions suitable for non-panning scenes in the case where the determination made in step S208 is that a panning operation is not in progress. Specifically, for example, a larger number of taps are set for low-pass filtering. As a photographing condition suitable for scenes with a panning effect, the aperture may be set closer to the opening side than in photographing conditions suitable for non-panning scenes in the case where the determination made in step S208 is that a panning operation is not in progress. This is to set the field of depth shallow to make the background blur, so that panning makes the background appear to flow quickly.

On the other hand, in step S211, the control unit 102 sets photographing conditions suitable for scenes with no panning effect. In the present embodiment, for example, the control unit 102 sets photographing conditions such that a plurality of images are photographed with different exposure times. That is, as photographing conditions suitable for scenes with no panning effect, the control unit 102 sets a first photographing condition not intended for a panning effect and a second photographing condition intended for a significant panning effect. This is to avoid situations where only failed images are stored. For example, the control unit 102 sets at least an exposure time (second photographing condition) longer than that set in step S210 and an exposure time (first photographing condition) shorter than that set in step S210.

For an image photographed with the exposure time (second photographing condition) longer than that set in step S210, the intensity of noise reduction is set higher than that in the photographing conditions suitable for scenes with a panning effect. For an image photographed with the exposure time (first photographing condition) shorter than that set in step S210, the intensity of noise reduction is set lower than that in the photographing conditions suitable for scenes with a panning effect. For the image photographed with the exposure time (second photographing condition) longer than that set in step S210, the aperture may be set closer to the opening side than in the photographing conditions suitable for scenes with a panning effect. For the image photographed with the exposure time (first photographing condition) shorter than that set in step S210, both the exposure time and the intensity of noise reduction may be set the same as those in photographing conditions suitable for non-panning scenes set in step S212.

In step S212, the control unit 102 sets photographing conditions suitable for non-panning scenes. In the present embodiment, for example, the control unit 102 sets photographing conditions such that photographing is performed with an exposure time shorter than that set in step S210.

In step S213, the control unit 102 determines whether signal SW2 has been received from the operation unit 101. If signal SW2 is determined to have been received, photographing is performed in step S214 under photographing conditions set in any of steps S210 to S212. That is, photographing is performed under the set photographing conditions, and a series of recording operations described above is performed. On the other hand, if signal SW2 has not been received, steps S201 to S212 are repeated until signal SW2 is received, and the photographing conditions are updated as needed.

The present embodiment has described a method of determining whether a panning operation is in progress. If the image pickup apparatus 100 is set to a predetermined photographing mode by the operation unit 101, a determination as to whether a panning operation is in progress may be made on the basis of a set condition. For example, if the image pickup apparatus 100 has, and is set to, a panning mode in which photographing is performed under predetermined photographing conditions and is followed by predetermined image processing, the control unit 102 always determines in step S208 that a panning operation is in progress.

Separation into Subject and Background

A method of separating a photographing screen into a subject region and a background region will now be described.

Figure 4:
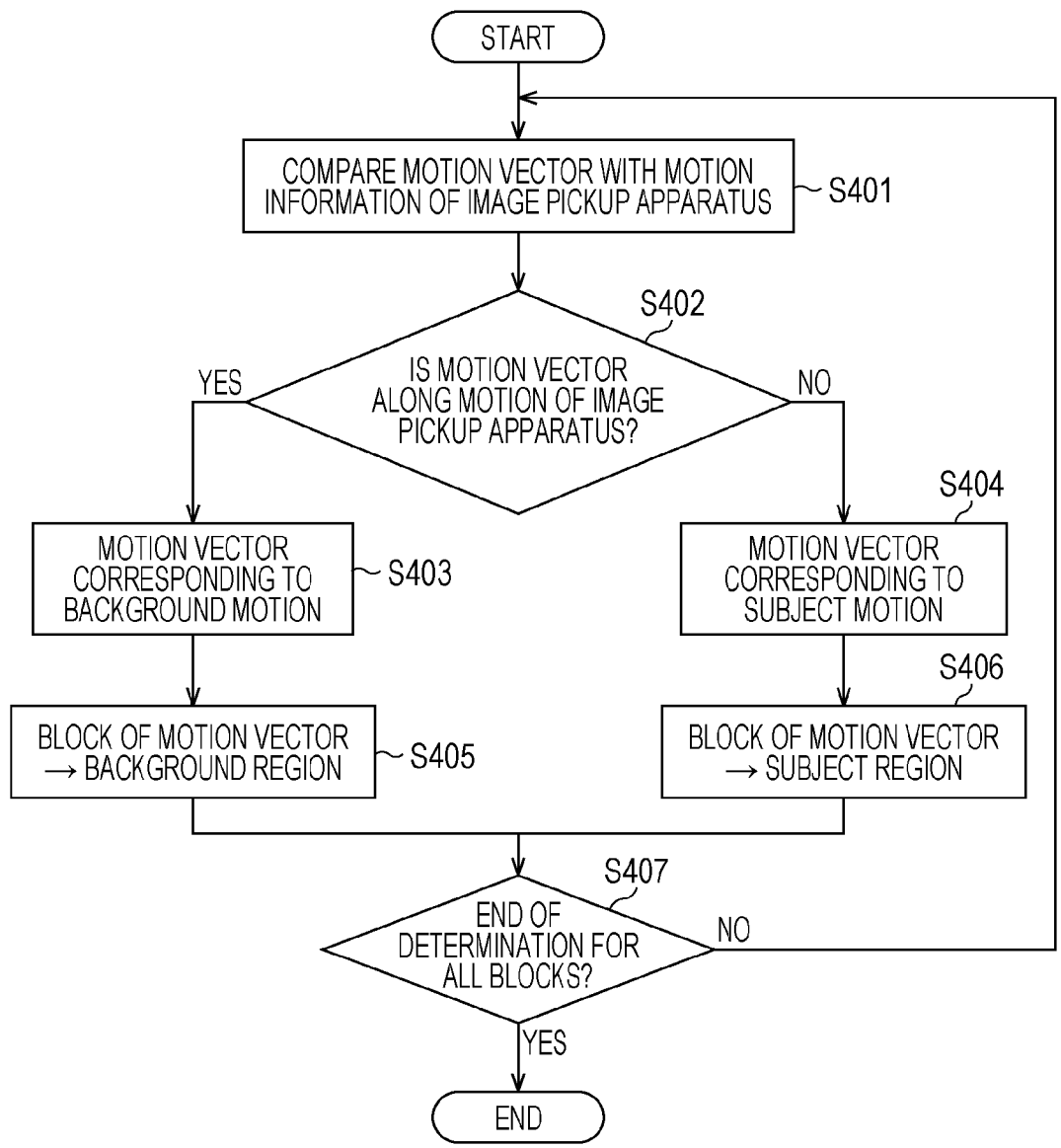
FIG. 4 is a flowchart illustrating a procedure for separating a photographing screen into a subject region and a background region.

FIG. 4 is a flowchart illustrating a procedure in which, in step S203 of FIG. 2, the subject/background separation unit 106 separates the photographing screen into a subject region and a background region. First, in step S401, the subject/background separation unit 106 compares a motion vector calculated in step S202 with the motion of the image pickup apparatus 100 acquired in step S201. In step S402, the subject/background separation unit 106 determines whether the motion vector is along the motion of the image pickup apparatus 100.

As a method of determining whether the motion vector is along the motion of the image pickup apparatus 100 in the present embodiment, the subject/background separation unit 106 compares an angular velocity in the yaw direction output from the angular velocity sensor with a right-and-left component of the motion vector. The angular velocity in the yaw direction and the right-and-left component of the motion vector are regarded as representing a standstill when they are less than predetermined values. The subject/background separation unit 106 calculates the angular velocity in the yaw direction and the right-and-left component of the motion vector to determine which of leftward motion, standstill, and rightward motion is the motion to which each of the calculated values belongs. If the angular velocity in the yaw direction is determined to belong to "leftward motion" and the right-and-left component of the motion vector is determined to belong to "rightward motion" (or the angular velocity in the yaw direction is determined to belong to "rightward motion" and the right-and-left component of the motion vector is determined to belong to "leftward motion"), or if the angular velocity in the yaw direction and the right-and-left component of the motion vector are both determined to belong to "standstill", the motion vector is regarded as being along the motion of the image pickup apparatus 100. For the angular velocity sensor, the outputs in both the pitch and yaw directions may be used in combination. For the motion vector, both the right-and-left and up-and-down components may be used in combination. For example, angles calculated from two directions may be compared. The comparison may take into account the output of the angular velocity sensor and the magnitude of the motion vector.

If the motion vector is determined to be along the motion of the image pickup apparatus 100 in step S402, the motion vector is regarded as being generated by the motion of the image pickup apparatus 100 in step S403. Then in step S405, a block for which the motion vector has been calculated is regarded as belonging to a background region.

On the other hand, if the motion vector is determined not to be along the motion of the image pickup apparatus 100 in step S402, the motion vector is regarded in step S404 as being generated by the motion of the subject. Then in step S406, a block for which the motion vector has been calculated is regarded as belonging to a subject region.

In step S407, the subject/background separation unit 106 determines whether the determination of the motion vector has been made for all the blocks. If the determination has been made for all the blocks, the process ends here. If the determination has not yet been made for all the blocks, the process returns to step S401 and is repeated.

Although the motion information of the image pickup apparatus 100 and motion vectors in the image are compared in the present embodiment, only motion vectors in the image may be used to separate the photographing screen into a subject region and a background region. In this case, as a method for calculating a motion vector in the background region, the magnitude and the angle of a motion vector in each of blocks at the edge of the photographing screen (i.e., the blocks included in a plurality of blocks in each image illustrated in FIG. 3) are calculated. Then, motion vectors with the most frequent magnitude and angle are regarded as belonging to the background region. This information is used as motion information of the image pickup apparatus 100 to perform the process illustrated in FIG. 4.

Calculation of Contrast Value

A process of calculating a contrast value in each of a plurality of regions obtained by dividing the photographing screen will now be described.

Figure 5:
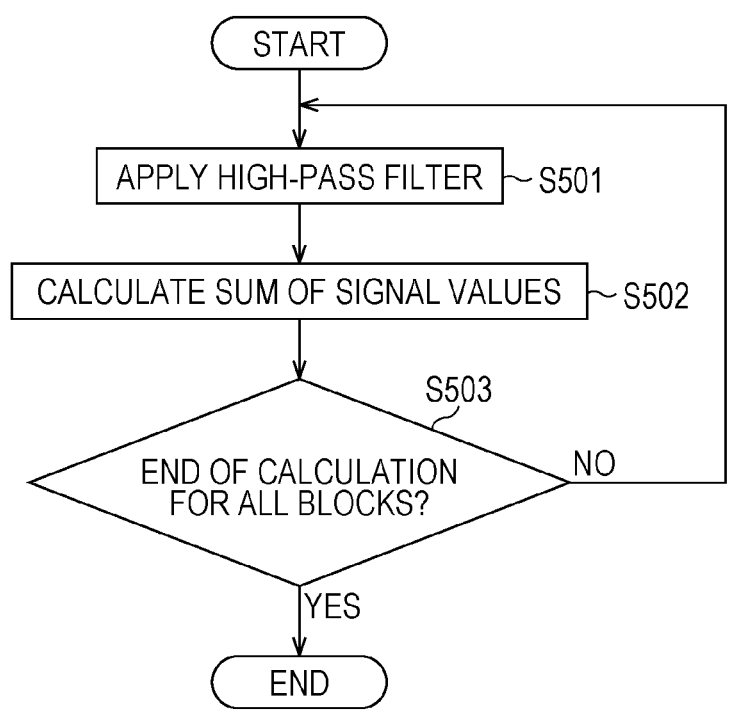
FIG. 5 is a flowchart illustrating a procedure for calculating a contrast value of each block.

FIG. 5 is a flowchart illustrating a procedure in which, in step S205 of FIG. 2, the contrast calculating unit 117 calculates a contrast value in each block. The operation of dividing the photographing screen into a plurality of blocks has been done in step S202. The following process is performed for each of the blocks obtained in step S202.

In step S501, the contrast calculating unit 117 applies a high-pass filter to one of the blocks obtained by dividing the photographing screen. The high-pass filter increases its output value as a difference in brightness between pixels increases. In step S502, the signal values calculated by the high-pass filter are summed, and the sum of absolute values of differences (SAD) in brightness value between pixels is calculated to determine the contrast value of the block.

In step S503, the contrast calculating unit 117 determines whether the calculation of a contrast value has been completed for all the blocks. If the calculation of a contrast value is determined to have been completed for all the blocks, the process ends here. If the calculation of a contrast value has not been completed for all the blocks, the process returns to step S501 and is repeated.

Determination of Panning Effect

A process will be described which determines, on the basis of an image signal, whether a captured image can achieve a visual effect of panning (i.e., whether panning is effective). The expression "a panning effect cannot be achieved" means that a visual effect of panning cannot be easily achieved in the result of photographing, and does not necessarily mean that no panning effect can be achieved at all. An image having a panning effect is, for example, an image that can fully show the fast movement of the subject. An image with a background having low contrast and less high-frequency components cannot easily achieve a panning effect. Also, if an image has less contrast between the main subject and the background, or if the ratio of the main subject to the background is greater than or less than a predetermined value, a panning effect may not be able to be fully achieved. In the present embodiment, a determination as to whether a panning effect can be achieved is made by evaluating at least one of a main subject region including a main subject and a background region including a background. The following description refers to a process of determining whether there is contrast in a background region.

Figure 6:
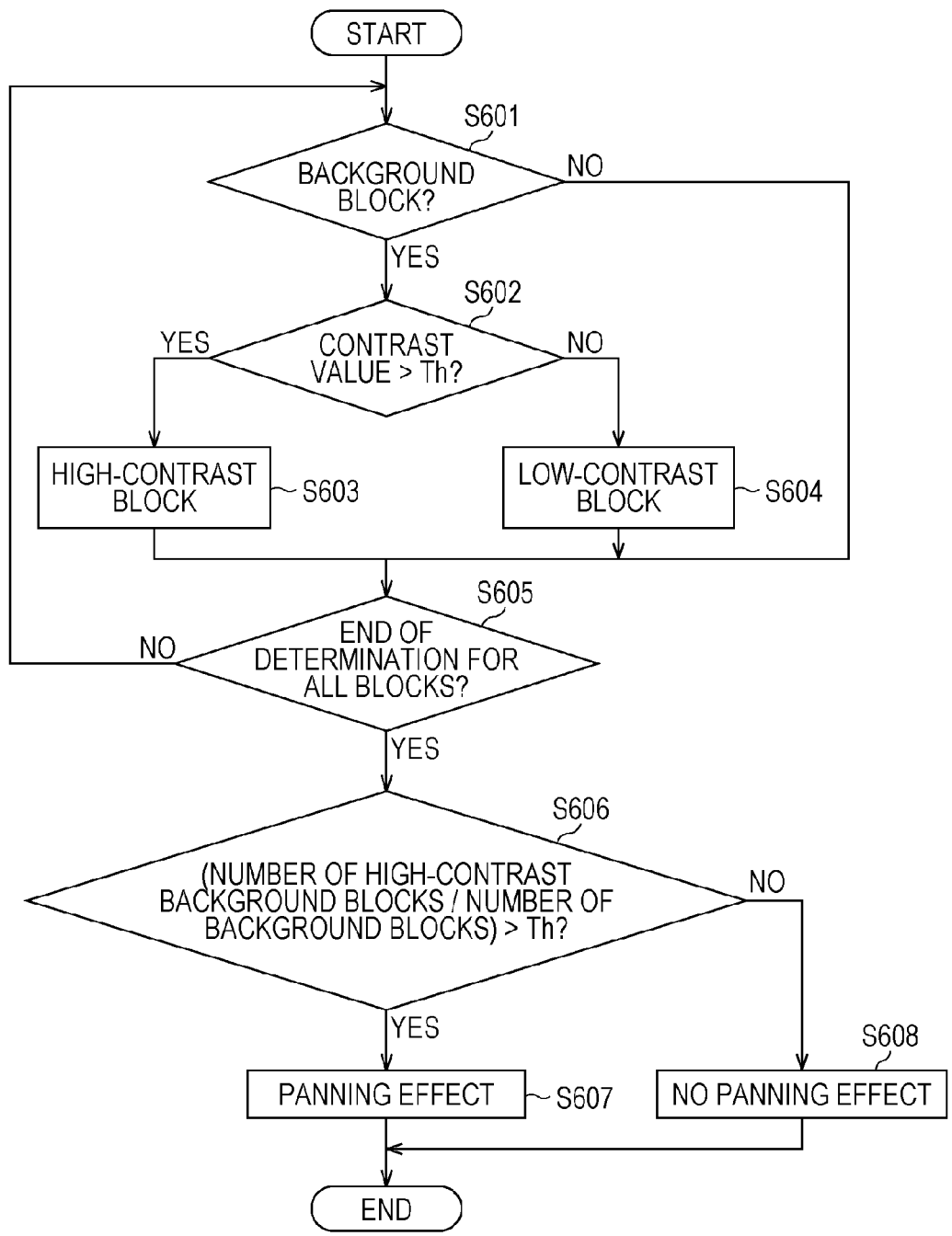
FIG. 6 is a flowchart illustrating a procedure for determining whether a panning effect can be achieved.

FIG. 6 is a flowchart illustrating a procedure for determining, in step S206 of FIG. 2, whether a panning effect can be achieved.

In step S601, the contrast calculating unit 117 determines whether a target block is in the background region. If the target block is determined to be in the background region, the process proceeds to step S602. If the target block is determined not to be in the background region, the process proceeds to step S605.

In step S602, the contrast calculating unit 117 determines whether a calculated contrast value of the target block is higher than a predetermined value. If the contrast value is determined to be higher than the predetermined value, the process proceeds to step S603, where the contrast calculating unit 117 determines that the target block is a high-contrast block. On the other hand, if the contrast value is determined to be lower than or equal to the predetermined value in step S602, the process proceeds to step S604, where the contrast calculating unit 117 determines that the target block is a low-contrast block.

In step S605, the contrast calculating unit 117 determines whether steps S601 to S604 have been completed for all the blocks. If these steps are determined to have been completed for all the blocks, the process proceeds to step S606. Otherwise, the process returns to step S601 and is repeated.

In step S606, the panning effect determination unit 118 calculates the proportion of high-contrast blocks in the background region, and determines whether the calculated proportion is greater than a predetermined threshold. If the calculated proportion is determined to be greater than the predetermined threshold, the process proceeds to step S607, where the panning effect determination unit 118 determines that the captured image has a panning effect. On the other hand, if the calculated proportion is determined to be less than or equal to the predetermined value in step S606, the process proceeds to step S608, where the panning effect determination unit 118 determines that the captured image has no panning effect.

In the present embodiment, a determination as to whether a panning operation is in progress is made in accordance with whether there is motion of the image pickup apparatus 100 and the background, and also in accordance with the amount of motion of the subject. However, not all of these conditions necessarily need to be used to make the determination. The determination as to whether a panning operation is in progress can be made as long as a relationship between the presence or absence of motion of the background and the amount of motion of the subject can be acquired. If image data with a longer exposure time is generated under the photographing conditions set in step S211 of FIG. 2, contrast values may be calculated for the image data in accordance with a procedure similar to that illustrated in FIG. 5. Then, the image processing unit 105 may perform processing that increases contrast values of low-contrast blocks.

As described above, the method of determining whether a panning effect can be achieved is not limited to evaluation of contrast in the background region. That is, this determination may be made by evaluating at least one of a main subject region including a main subject and a background region including a background. For example, between the main subject region and the background region, evaluation of at least one of contrast, similarity in brightness (obtained by taking a difference in brightness etc.), and similarity in color (obtained by taking a difference in color or color difference) may be made to determine whether a panning effect can be achieved. The size of the main subject region or the ratio of the main subject region to the background region in the entire image may be calculated to make the determination described above. In this case, if the calculated size or ratio is greater than a first reference value, the background region is determined to be too small to achieve a panning effect, whereas if the calculated size or ratio is smaller than a second reference value which is smaller than the first reference value, the main subject region is determined to be too small to achieve a panning effect. The determination as to whether a panning effect can be achieved may be made by determining whether the main subject region is present at an appropriate position. In this case, for example, if the main subject region is present only at the edge of the image, the panning effect determination unit 118 may determine that no panning effect can be achieved. Results of analysis made by at least two of various image analyzing techniques described above may be used in combination to determine whether a panning effect can be achieved.

The image pickup apparatus 100 of the present embodiment is configured to determine not only whether it is in a panning state, but also whether a panning effect can be achieved. It is thus possible to appropriately change the photographing conditions in accordance with the determination.

Other Embodiments

The present invention may be implemented by executing the process described below. That is, the process is executed when, after software (program) that performs the functions of the above-described embodiments is provided through a network or various storage media to a system or apparatus, a computer (e.g., central processing unit (CPU) or micro processing unit (MPU)) of the system or apparatus reads out and executes the program.

As described above, the present invention makes it possible to appropriately change the photographing conditions in accordance with the panning effect.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-129455 filed Jun. 24, 2014, which is hereby incorporated by reference herein in its entirety.

What is claimed is:

1. An image pickup apparatus having a processor executing instructions in a memory, wherein the processor comprises:

an image pickup element that picks up an image of a subject to generate image data;

an analyzing unit that analyzes a background region of the image data;

a determining unit that determines whether the image data has a panning effect on the basis of a result of the analysis made by the analyzing unit;

and a control unit that controls photographing conditions for a panning shot, accordance with the determination made by the determination unit, wherein the analyzing unit analyzes at least one of:

(1) a contrast in the background region, (2) a difference in brightness between a subject region of the image data and the background region, (3) a difference in color between the subject region and the background region, and (4) a difference in color difference between the subject region and the background region.

2. The image pickup apparatus according to claim 1, wherein if the determining unit determines that the image data does not have a panning effect, the panning-related photographing conditions are changed such that a captured image with an exposure time shorter than that in photographing conditions used when the determining unit determines that the image data has a panning effect is generated.

3. The image pickup apparatus according to claim 1, wherein if the determining unit determines that the image data does not have a panning effect, the panning-related photographing conditions are changed such that a captured image with an exposure time longer than that in photographing conditions used when the determining unit determines that the image data has a panning effect is generated.

4. The image pickup apparatus according to claim 1, wherein if the determining unit determines that the image data does not have a panning effect, the panning-related photographing conditions are changed such that captured images with a plurality of exposure times different from an exposure time used when the determining unit determines that the image data has a panning effect are generated.

5. The image pickup apparatus according to claim 1, wherein if the contrast in the background region analyzed by the analyzing unit is lower than a reference value, the control unit changes the panning-related photographing conditions such that a captured image with an exposure time shorter than that used when the contrast is higher than the reference value is generated.

6. The image pickup apparatus according to claim 1, wherein if the difference in brightness between the subject region and the background region analyzed by the analyzing unit is smaller than a reference value, the control unit changes the panning-related photographing conditions such that a captured image with an exposure time shorter than that used when the difference in brightness between the subject region and the background region is greater than the reference value is generated.

7. The image pickup apparatus according to claim 1, wherein if the difference in color between the subject region and the background region analyzed by the analyzing unit is smaller than a reference value, the control unit changes the panning-related photographing conditions such that a captured image with an exposure time shorter than that used when the difference in color between the subject region and the background region is greater than the reference value is generated.

8. The image pickup apparatus according to claim 1, wherein if the difference in color difference between the subject region and the background region analyzed by the analyzing unit is smaller than a reference value, the control unit changes the panning-related photographing conditions such that a captured image with an exposure time shorter than that used when the difference in color difference between the subject region and the background region is greater than the reference value is generated.

9. The image pickup apparatus according to claim 1, wherein the analyzing unit determines a size of the subject region.

10. The image pickup apparatus according to claim 1, wherein the panning-related photographing conditions include at least one of an aperture value for photographing, a set of parameters of noise reduction for a captured image, and a set of parameters of processing for increasing a contrast value, and the panning-related photographing conditions are changed on the basis of a result of the analysis made by the analyzing unit.

11. The image pickup apparatus according to claim 1, further comprising:
a motion detecting unit that detects motion information about motion in a screen on the basis of the image data generated by the image pickup element; and
a separating unit that separates the image data into the subject region and the background region on the basis of the motion information detected by the motion detecting unit.

12. The image pickup apparatus according to claim 11, wherein the motion detecting unit further detects motion information about motion of the image pickup apparatus using a sensor; and
the separating unit separates the image data into the subject region and the background region on the basis further of the motion information about motion of the image pickup apparatus.

13. The image pickup apparatus according to claim 12, wherein the separating unit compares the motion information about motion in the screen showing the image data with the motion information about motion of the image pickup apparatus, and identifies a region having a motion vector detected from the motion of the image pickup apparatus as the background region.

14. The image pickup apparatus according to claim 11, wherein the motion detecting unit detects the motion information by calculating a motion vector for each of a plurality of regions of the image data shown in the screen.

15. The image pickup apparatus according to claim 11, further comprising an operation determination unit that determines, on the basis of the motion information detected by the motion detecting unit, whether the image data generated by the image pickup unit is based on an image obtained through panning,
wherein the control unit performs control such that the panning-related photographing conditions are changed when the operation determination unit determines that the image data is based on an image obtained through panning.

16. An image pickup apparatus having a processor executing instructions in a memory, wherein the processor comprises:
an image pickup element that picks up an image of a subject to generate image data;
an operation determination unit that determines, on the basis of the image data generated by the image pickup element unit, whether the image data is based on an image obtained through panning if a difference in motion vector between a background region and a subject region of the image data has continued to exceed a predetermined value for a predetermined period of time;
a control unit that controls photographing conditions for the image pickup operation of the image pickup element unit on the basis of a result of the determination made by the operation determination unit.

17. The image pickup apparatus according to claim 16, wherein the operation determination unit makes the determination in accordance with a photographing mode.

18. The image pickup apparatus according to claim 16, wherein the control unit changes the photographing conditions such that intensity of noise reduction is higher than that in photographing conditions used when the operation determination unit determines that the image data is not based on an image obtained through panning.

19. The image pickup apparatus according to claim 1, wherein the control unit changes the photographing conditions such that an aperture is set closer to an opening side than in photographing conditions used when the determining unit determines that the image data does not have a panning effect.

20. The image pickup apparatus according to claim 1, further comprising a notification unit that gives a notification of a result of the determination made by the determining unit.

21. The image pickup apparatus according to claim 20, wherein the notification unit gives the notification by displaying an icon in a display unit.

22. The image pickup apparatus according to claim 1, wherein the analyzing unit calculates a sum of absolute values of differences in brightness value between pixels in a given region.

23. An image pickup method comprising:
- an image pickup step of picking up an image of a subject to generate image data;
- an analyzing step of analyzing a background region of the image data;
- a determining step of determining whether the image data has a panning effect on the basis of a result of the analyzing; and
- a control step of controlling photographing conditions for panning a shot in accordance with the determining in the determination step,
- wherein the analyzing step analyzes at least one of:
  (1) a contrast in the background region,
  (2) a difference in brightness between a subject region of the image data and the background region,
  (3) a difference in color between the subject region and the background region, and
  (4) a difference in color difference between the subject region and the background region.

24. A non-transitory computer readable storage medium storing containing computer-executable instructions for controlling an image pickup apparatus that, when executed by a processor, perform the following steps:
- an image pickup step of picking up an image of a subject to generate image data;
- an analyzing step of analyzing a background region of the image data;
- a determining step of determining whether the image data has a panning effect on the basis of a result of the analyzing; and
- a control step of controlling photographing conditions for panning a shot are changed in accordance with the determining in the determination step,
- wherein the analyzing step causes a computer to execute analysis of at least one of:
  (1) a contrast in the background region,
  (2) a difference in brightness between a subject region of the image data and the background region,
  (3) a difference in color between the subject region and the background region, and
  (4) a difference in color difference between the subject region and the background region.

* * * * *